United States Patent
Kim et al.

(10) Patent No.: US 7,450,861 B2
(45) Date of Patent: Nov. 11, 2008

(54) RETURN-TO-ZERO ALTERNATIVE-MARK-INVERSION OPTICAL TRANSMITTER AND METHOD FOR GENERATING RETURN-TO-ZERO ALTERNATIVE-MARK-INVERSION OPTICAL SIGNAL USING THE SAME

(75) Inventors: Yong-Gyoo Kim, Seoul (KR); Kwan-Soo Lee, Seoul (KR); Chang-Sup Shim, Seoul (KR); Jae-Hoon Lee, Seoul (KR); Seong-Taek Hwang, Pyeongtaek-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 414 days.

(21) Appl. No.: 11/224,410

(22) Filed: Sep. 12, 2005

(65) Prior Publication Data

US 2006/0110168 A1    May 25, 2006

(30) Foreign Application Priority Data

Nov. 20, 2004    (KR) .................. 10-2004-0095562

(51) Int. Cl.
*H04B 10/12* (2006.01)
(52) U.S. Cl. .................. 398/185; 398/186; 398/188

(58) Field of Classification Search ............... 398/183, 398/186, 188, 185, 189
See application file for complete search history.

(56) References Cited

U.S. PATENT DOCUMENTS

| | | | |
|---|---|---|---|
| 6,097,525 A * | 8/2000 | Ono et al. .................. 398/185 |
| 6,559,996 B1* | 5/2003 | Miyamoto et al. .......... 398/183 |
| 2003/0156774 A1* | 8/2003 | Conradi .......................... 385/2 |
| 2004/0217475 A1* | 11/2004 | Derkits et al. ............... 257/743 |
| 2004/0240888 A1* | 12/2004 | Leuthold et al. ............. 398/149 |
| 2005/0078965 A1* | 4/2005 | Kim et al. .................... 398/183 |

FOREIGN PATENT DOCUMENTS

| | | |
|---|---|---|
| JP | 10-112688 | 4/1998 |
| JP | 2000-106543 | 4/2000 |

\* cited by examiner

*Primary Examiner*—Christina Y Leung
(74) *Attorney, Agent, or Firm*—Cha & Reiter, LLC

(57) ABSTRACT

An optical transmitter for generating return-to-zero alternative-mark-inversion (RZ-AMI) optical signals and a method for generating the optical signals are provided. The optical transmitter includes a light source radiating at its output an intensity-modulated light beam based upon intensity of a first data, a precoder for precoding a second data having the information identical to the first data, and a Mach Zehnder modulator for phase-modulating the intensity-modulated light on basis of the precoded second data to generate a return-to-zero alternative-mark-inversion (RZ-AMI) optical signal.

3 Claims, 4 Drawing Sheets

RETURN-TO-ZERO ALTERNATIVE-MARK-INVERSION OPTICAL TRANSMITTER AND METHOD FOR GENERATING RETURN-TO-ZERO ALTERNATIVE-MARK-INVERSION OPTICAL SIGNAL USING THE SAME

CLAIM OF PRIORITY

This application makes reference to, incorporates the same herein, and claims all benefits accruing under 35 U.S.C. §119 from an application entitled "Return-To-Zero Alternative-Mark-Inversion Optical Transmitter and Method for Generating Return-To-Zero Alternative-Mark-Inversion Optical Signal Using the Same," earlier filed in the Korean Intellectual Property Office on Nov. 20, 2004 and thereby duly assigned Serial No. 2004-95562 by the Office.

BACKGROUND OF THE INVENTION

1. Field of the Invention

The present invention relates generally to an optical transmitter and, in particular, to an optical transmitter for generating return-to-zero alternative-mark-inversion (RZ-AMI) optical signals using a Mach-Zehnder modulator.

2. Description of the Related Art

It is generally known in the state of the art that a return-to-zero (hereinafter, referred to as "RZ") optical signal is adapted to carry any information in its intensity, so that upon representation of bit "1" an energy state of the optical signal moves from "0" energy level to "1" energy level and then returns to "0" energy level. Such return-to-zero characteristics will cause an RZ optical signal to have narrow pulse width. In application of an optical transmission system with data rate of more than 20 Gbps, it may become less sensitive to the non-linearity of an optical fiber that serves as a transmission medium for the optical signal.

Although the intensity of optical signal in such a return-to-zero alternative-mark-inversion (hereinafter, referred to as "RZ-AMI") modulation system may be substantially same as that in RZ optical signals, the RZ-AMT modulation system is characterized in that the phases of optical signals are inverted for every "1" bit. Therefore, while the RZ-AMI optical signal is designed to keep the advantages of RZ modulation system, its narrow spectrum width gives another advantage in improving the frequency efficiency in a dense wavelength division multiplexed (DWDM) optical transmission system, and the optical signal is generally less sensitive to dispersion of optical fiber. Moreover, as the phases of the RZ-AMI optical signal are inverted for every "1" bit, its carrier-frequency components may be suppressed to allow more resistance to Brillouin non-linear effect.

FIG. 1 shows a schematic block diagram of a conventional RZ-AMI optical transmitter 100 including a precoder 110, a low-pass filter (LPF) 120, a continuous wave laser diode (CW-LD) 130, and first and second Mach-Zehnder modulators (MZM) 140 and 150. The precoder 110 further includes a 1-bit delay circuit (T) 114 and an exclusive-OR circuit 112 for precoding binary data of non-return-to-zero (NRZ) signal as inputted. The low-pass filter 120 serves to limit the bandwidth of the precoded data. This low-pass filter has 3 dB bandwidth corresponding to one quarter of the data rate and precodes the input precoded data to ternary data with its limited bandwidth. For example, when the data rate is 40-Gbps, the low-pass filter 120 may have a 10-GHz, 3-dB bandwidth. The continuous wave laser diode 130 provides at its output a CW mode of light beam.

In the meantime, the first Mach-Zehnder modulator 140 functions to modulate an incident light from the continuous wave laser diode 130 on basis of the ternary data to generate a duobinary optical signal at its output. Here, a bias position of the first Mach-Zehnder modulator 140 may be preferably set to a null point corresponding to a minimum value on a transfer curve. The second Mach-Zehnder modulator 150 operates to modulate the duobinary optical signal input from the first Mach-Zehnder modulator 140 on basis of a sine wave clock signal having a frequency corresponding to one half of a clock frequency of the binary data, for generation of RZ-AMI optical signal at its output. For example, when the data rate is 40 Gbps, the sine wave clock signal has a frequency of 20 GHz, wherein a bias position of the second Mach-Zehnder modulator 150 may be preferably set to a null point corresponding to a minimum value on a transfer characteristic curve. As is in RZ signals, in representation of "1" bit, the RZ-AMI optical signal allows its energy to move from "0" energy level to "1" energy level and then come back to "0" energy level, while inverting its phase either from "0" to "$\pi$" or from "$\pi$" to "0" for every "1" bit.

The RZ-AMI optical transmitter 100 may be constructed with a combination of the typical duobinary optical transmitter using the first Mach-Zehnder modulator 140 and the second Mach-Zehnder modulator 150 for generating carrier-suppressed return-to-zero (CS-RZ) optical signals, so it may be also referred to as a duobinary carrier-suppressed return-to-zero (DCS-RZ) optical transmitter.

FIG. 2 shows an eye diagram of an RZ-AMI optical signal output from the optical transmitter 100 shown in FIG. 1. As seen in FIG. 1, it will be appreciated that ripples 210 are formed on a space ("0" or "low") level of the eye diagram when a low-pass filter 120 is used with 3-dB bandwidth corresponding to one quarter of the binary data rate. These ripples usually result in a deterioration of the receive sensitivity in a receiving end of RZ-AMI optical signal.

SUMMARY OF THE INVENTION

Therefore, the present invention generally aims at solving the aforementioned problems and provides additional advantages, by providing an optical transmitter for generating return-to-zero alternative-mark-inversion (RZ-AMI) optical signals and a method for generating the optical signals. The transmitter is capable of removing ripples occurring on a space level of the eye diagram so as to improve the receive sensitivity without utilizing a low-pass filter.

In one embodiment, there is provided an optical transmitter for generating return-to-zero alternative-mark-inversion (RZ-AMI) optical signals which includes: a light source irradiating an intensity-modulated light beam based upon intensity of a first data input; a precoder for preceding a second data, the second data including the information identical to the first data; and a Mach Zehnder modulator for phase-modulating the intensity-modulated light on the basis of the precoded second data to generate a return-to-zero alternative-mark-inversion (RZ-AMI) optical signal.

In another embodiment, there is provided a method for generating return-to-zero alternative-mark-inversion (RZ-AMI) optical signals in an optical transmitter which includes the step of: generating non-return-to-zero optical signals intensity-modulated on basis of a first data; precoding a second data, the second data having the information identical to the first data; and phase-modulating the intensity-modulated non-return-to-zero optical signals on the basis of the precoded second data, so as to make an inversion of its phase for every "1" bit.

BRIEF DESCRIPTION OF THE DRAWINGS

The above features and advantages of the present invention will become more apparent from the following detailed description when taken in conjunction with the accompanying drawings in which.

DETAILED DESCRIPTION

Embodiments of the present invention will be described hereinafter with reference to the accompanying drawings. A detailed construction and circuit elements are described only to assist in a comprehensive understanding of the invention. Thus, it will be apparent that the present invention can be carried out without these particulars. For the purposes of clarity and simplicity, well-known functions or constructions are not described in detail as they would obscure the invention in unnecessary detail. Furthermore, although many particular details such as circuit components or blocks are to be shown in the following description, they are provided for a better understanding of the invention to the reader by way of example only, but not limited to those details disclosed herein.

Figure 1:
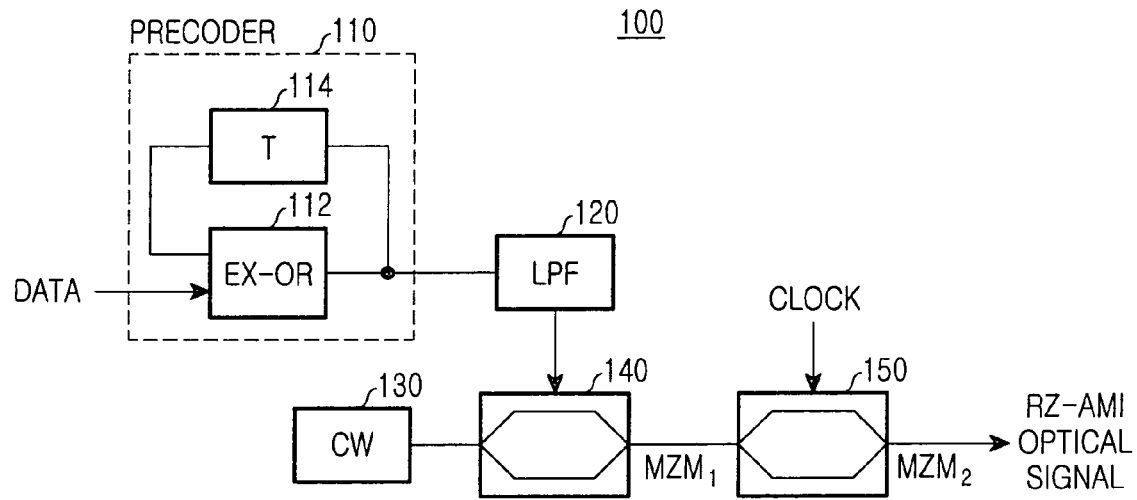
FIG. 1 shows a schematic block diagram for a conventional return-to-zero alternative-mark-inversion (RZ-AMI) optical transmitter.
Figure 2:
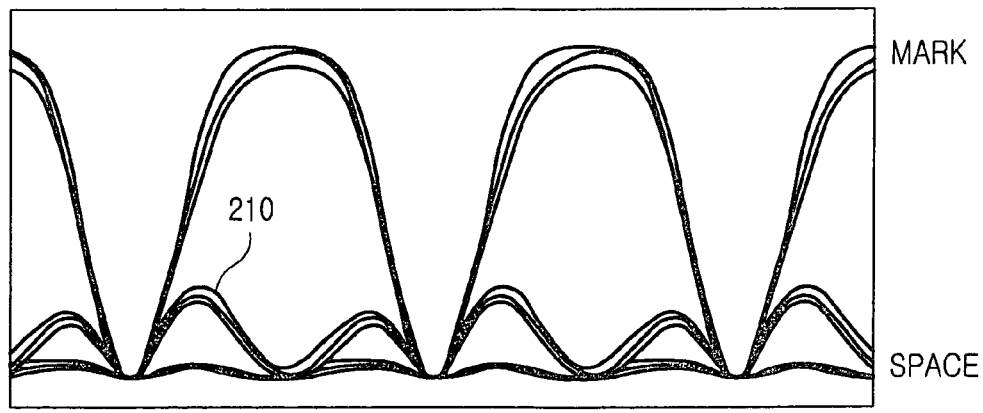
FIG. 2 schematically shows an eye diagram for the return-to-zero alternative-mark-inversion (RZ-AMI) optical signal output from the optical transmitter as shown in FIG. 1.
Figure 3:
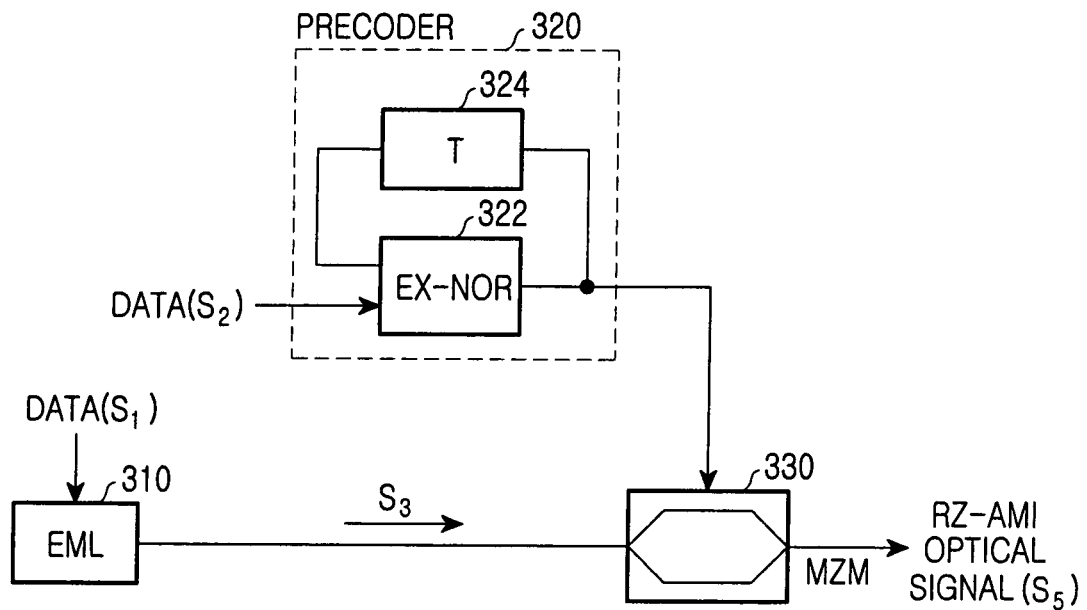
FIG. 3 shows a return-to-zero alternative-mark-inversion (RZ-AMI) optical transmitter according to an embodiment of the present invention.
Figure 4:
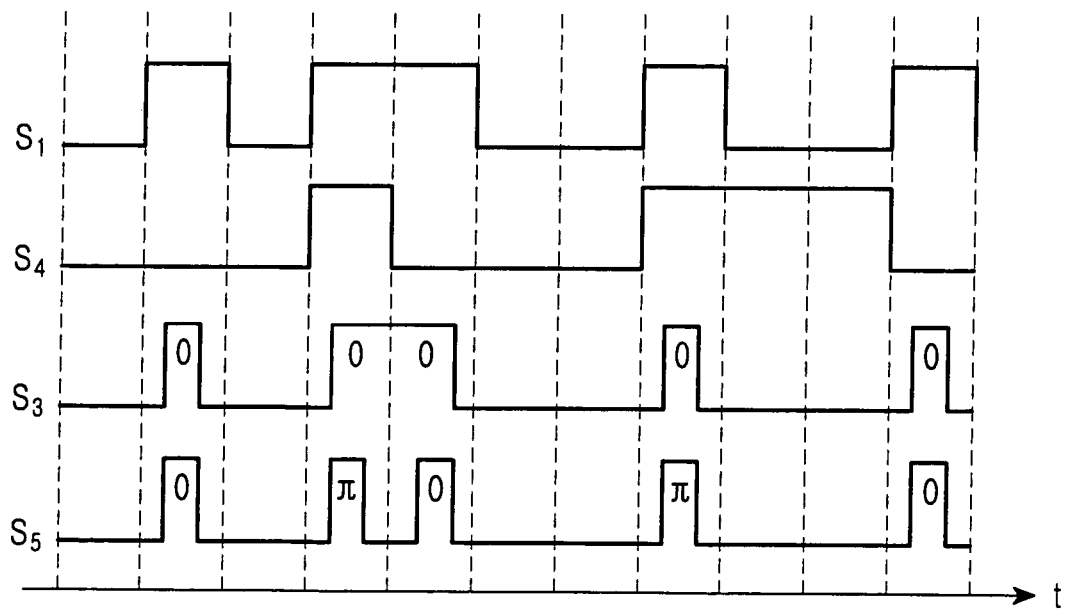
FIG. 4 schematically shows a timing diagram for various signals processed in the optical transmitter shown in FIG. 3.

Referring now to FIG. 3, a return-to-zero alternative-mark-inversion (RZ-AMI) optical transmitter 300 according to an embodiment of the present invention may include an electro-absorption modulated laser (EML) 310 serving as a light source, a precoder 320, and a Mach Zehnder modulator (MZM) 330. The electro-absorption modulated laser 310 may function as a light source capable of performing a direct modulation of data. FIG. 4 shows a timing diagram for various signals processed in the optical transmitter as shown in FIG. 3 for better understanding to the invention.

In operation, the electro-absorption modulated laser 310 provides an optical signal $S_3$ intensity-modulated on basis of first data $S_1$ that is a non-return-to-zero (NRZ) binary signal as inputted thereto. As shown in FIG. 4, the intensity-modulated optical signal $S_3$ has no change in phase but some change in its intensity. The electro-absorption modulated laser 310 may be manufactured from a single-chip integrated circuit component on which both a laser diode and a modulator are fabricated. It will be appreciated that these electro-absorption modulated laser components will be more advantageous in size reduction and cost saving as compared to other devices with the identical function.

Figure 5:
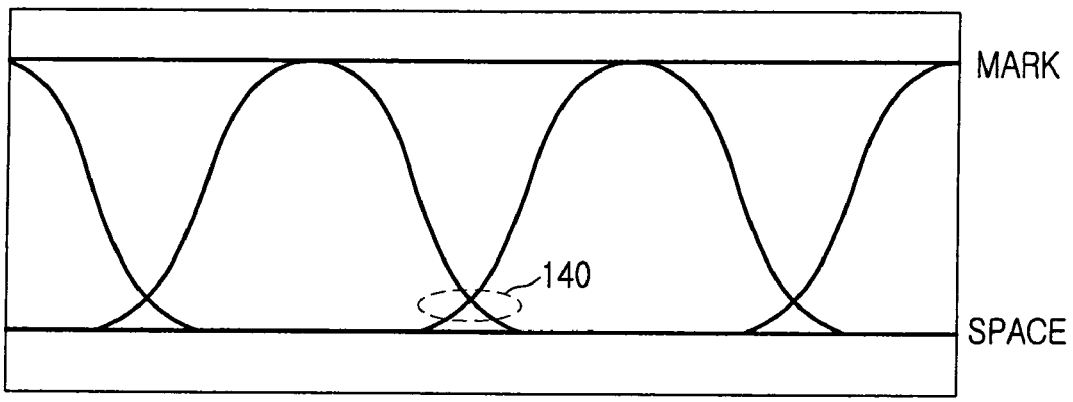
FIG. 5 schematically shows an eye diagram for the intensity-modulated optical signals output from an electro-absorption modulated laser (EML) shown in FIG. 3.

Referring then to FIG. 5, it is shown an eye diagram for the intensity-modulated optical signals output from an electro-absorption modulated laser 300 as shown in FIG. 3. Ad the electro-absorption modulated laser 300 has a non-linear transfer curve, its zero-crossing point could be lowered to a position below an intermediate level between a space level and a mark level, if it is applied enough level of reverse bias potential, for instance, preferably, not greater than −2 Volts.

The precoder 320 for preceding the input second data $S_2$ includes a 1-bit delay circuit 324, denoted by T, and an Exclusive-NOR gate circuit 322, denoted by EX-NOR, in FIG. 3. The second data $S_2$ will have the same information as the first data $S_1$, that is, the same row of bits, and in this embodiment, the second data $S_2$ will also have the same waveform as the first data $S_1$. In the precoder 320 according to the present invention, the Exclusive OR gate of a prior art construction may be substituted by the Exclusive NOR gate circuit 322 as shown in FIG. 3. Exclusive-OR circuits usually provides logic "0" bit in case where both the first and second inputs are either logic "1" or logic "0", while they provide logic "1" bit in the remaining instances. The Exclusive NOR gate circuit 322 receives the second data to its first input and the 1-bit delayed feedback signal to its second input, so it provides logic "1" bit in its output in case where both the first and second inputs are either logic "1" bit or logic "0" bit, and it provides logic "0" bit in the remaining instances. This kind of logic operation may be referred to as an "Exclusive-NOR" logic operation.

The Mach Zehnder modulator (MZM) 330 operates to effect a phase-modulation to the intensity-modulated optical signal $S_3$ input from the electro-absorption modulated laser 310 on basis of the precoded second data $S_4$ input from the precoder 320, thereby outputting a phase-modulated RZ-AMI optical signal $S_5$. Here, the bias position of Mach Zehnder modulator 330 may be preferably set to a null point corresponding to the minimum value on the transfer curve. As is in RZ signals, RZ-AMI optical signal $S_5$ in representation of "1" bit allows its energy to move from "0" energy level to "1" energy level and then come back to "0" energy level, while inverting its phase either from "0" to "$\pi$" or from "$\pi$" to "0" for every "1" bit. For example, a dual-arm LiNbO$_3$ modulator may be used for such a Mach Zehnder modulator (MZM) 330.

Figure 6:
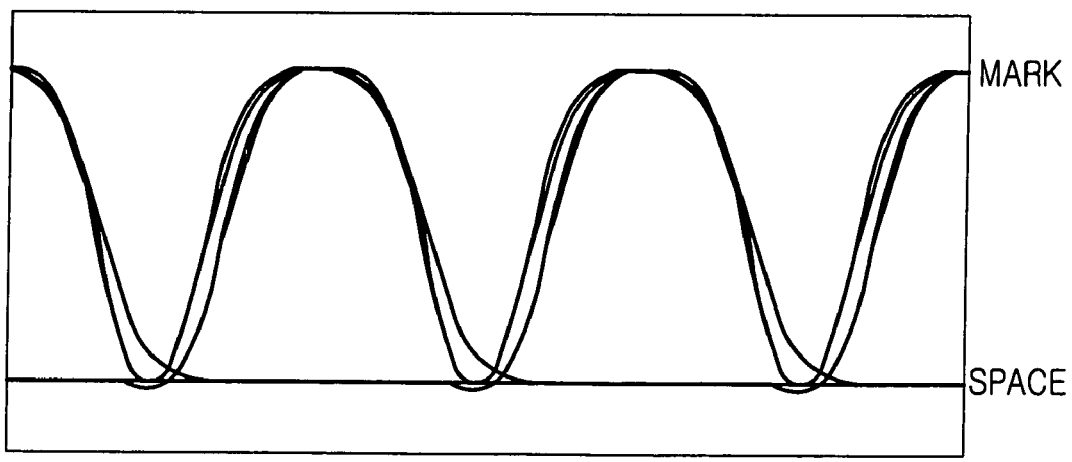
FIG. 6 schematically shows an eye diagram for the RZ-AMI optical signals output from the optical transmitter shown in FIG. 3.

FIG. 6 shows an eye diagram for the RZ-AMI optical signal $S_5$ output from the RZ-AMI optical transmitter 300. As seen from the eye diagram, it is appreciated that there are no ripples on the space level of the eye diagram.

Figure 7:
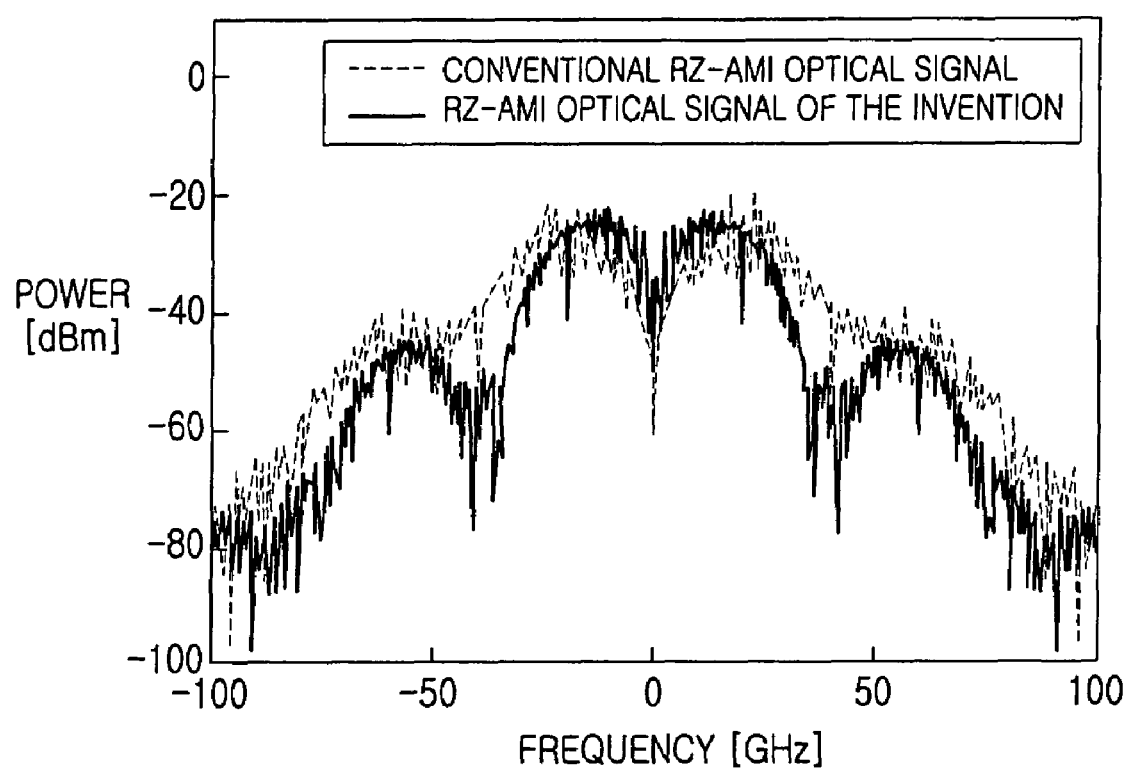
FIG. 7 shows, by way of comparison, a spectrum diagram of the RZ-AMI optical signals output from the conventional optical transmitter, for instance, shown in FIG. 1 and a spectrum diagram of the RZ-AMI optical signals output from the optical transmitter shown in FIG. 3 according to the present invention.

FIG. 7 illustrates two spectrum diagrams by way of comparison, i.e., firstly, a spectrum diagram of the RZ-AMI optical signal $S_5$ output from the RZ-AMI optical transmitter 300 and then, a spectrum diagram of a typical RZ-AMI optical signal. Comparing these spectrum diagrams, it will be well appreciated that the RZ-AMI signal according to the present invention has a narrower width of spectrum than the typical RZ-AMI signal.

As understood from the foregoing, it will be appreciated by a person skilled in the art that the RZ-AMI optical transmitter according to the present invention is configured to use a light source capable of a direct modulation of data and a precoder having an Exclusive-NOR gate and a 1-bit delay circuit to provide the RZ-AMI optical signals without ripples in a "space" level, thereby improving the receive sensitivity in a receiving stage of the optical signals. Moreover, as a spectrum width of the RZ-AMI optical signal according to the present invention is usually narrower than that of the conventional RZ-AMI optical signals, it would be more advantageous to improve efficiency of frequency in DWDM (Dense Wavelength Division Multiplexing) system.

While the present invention has been heretofore shown and described with reference to preferred embodiments, it will be understood by those skilled in the art that various changes and modifications in form and details may be made therein and the equivalents may be substituted for elements thereof, without departing from the spirit and scope of the invention as defined by the appended claims.

What is claimed is:

1. An optical transmitter for generating return-to-zero alternative-mark-inversion (RZ-AMI) optical signals, comprising:

electro-absorption modulated laser having a non-linear transfer curve for irradiating an intensity-modulated optical signal on the basis of first non-return-to-zero binary signal;

a precoder for precoding a second non-return-to-zero binary signal, said second non-return-to-zero binary signal having information and waveform identical to that of the first non-return-to-zero binary signal; and a Mach Zehnder modulator for phase-modulating the intensity-modulated optical signal on basis of the precoded second non-return-to-zero binary signal to generate a return-to-zero alternative-mark-inversion optical signal, wherein the return-to-zero alternative-mark-inversion optical signal from said Mach Zehnder modulator is a return-to-zero optical signal, a phase of which is adapted to be inverted for every "1" bit, and wherein a reverse bias voltage non greater than $-2V$ is applied to the electro-absorption modulated laser and a zero-crossing point of the intensity-modulated optical signal is set below an intermediate level between a space level and a mark level of the intensity-modulated optical signal.

2. The optical transmitter according to claim 1, wherein said precoder comprises 1-bit delay circuit and an Exclusive-NOR gate.

3. The optical transmitter according to claim 1, wherein the bias position of the Mach Zehnder modulator is set to a null point corresponding to the minimum value on a transfer curve of the Mach Zehnder modulator.

* * * * *